April 30, 1940.  H. R. MOYER  2,198,831
COMPOSITE PULLEY
Filed Aug. 26, 1937
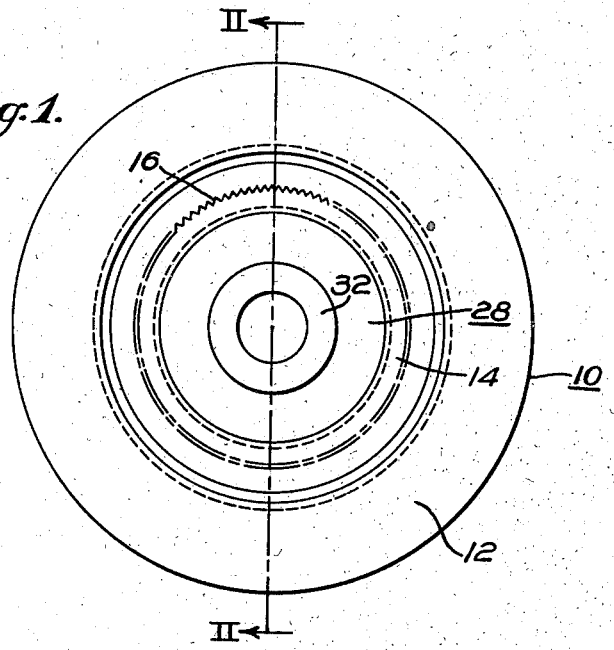
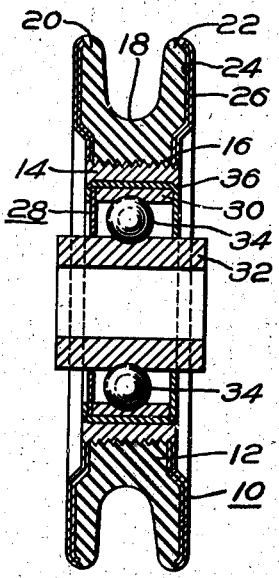
WITNESSES:
INVENTOR
Howard R. Moyer.
BY
ATTORNEY Patented Apr. 30, 1940

2,198,831

UNITED STATES PATENT OFFICE 2,198,831

COMPOSITE PULLEY

Howard R. Moyer, Wilkinsburg, Pa., assignor to Westinghouse Electric & Manufacturing Company, East Pittsburgh, Pa., a corporation of Pennsylvania Application August 26, 1937, Serial No. 161,087

4 Claims. (Cl. 74—230.7)

This invention relates to pulleys and particularly to composite pulleys.

In airplanes and the like, control wires operate on pulleys. Where these pulleys are molded from a fibrous material and a binder, it is found that the flanges forming the pulley groove sometimes have insufficient strength to pass inspection. In order to produce a pulley of the composite material which will pass inspection, it is necessary to strengthen the composite flanges without materially changing the weight of the pulley.

An object of this invention is to provide a composite pulley.

Another object of this invention is to provide a composite pulley having sufficient flange strength for withstanding strains which may be encountered.

A further object of this invention is to provide a free-running composite pulley, the flanges of which are reenforced for withstanding strains.

Other objects of this invention will become apparent from the following description, when taken in conjunction with the accompanying drawing, in which:

Figure 1 is a plan view of a pulley constructed in accordance with this invention, and Fig. 2 is a detailed view of the pulley constructed in accordance with this invention, taken along the line II—II of Fig. 1.

Referring to the drawing, a pulley 10 is provided which comprises a plurality of elements so associated as to produce a free running pulley having the desired strength. As illustrated, a web 12 of fibrous material such as cloths or woven fabric or paper which is impregnated with a phenolic, urea or other condensation resin product is molded under heat and pressure to a bushing 14. In order to provide a good bond between the molding material and the bushing, the outer surface of the bushing is roughened, as indicated at 16 to give a mechanical interlock for the molding material.

The web 12 of impregnated fibrous material is provided with a recess 18 about its periphery of a shape suitable for the pulley groove having flanges 20 and 22. The recess 18 may be either molded into the web during its consolidation under heat and pressure or the recess may be machined into the web after the web is molded.

As illustrated, the flanges 20 and 22 of the web forming the pulley groove are extremely thin, as compared to the shank of the web, and in practice have been found to fail under load. In order to increase the flange strength of the pulley, a facing sheet 24 or a plurality of facing sheets 24 and 26 of fibrous material impregnated with a condensation resin product may be disposed on each of the side faces of the web 12 of impregnated fibrous material and be molded therewith into an integral unit about the bushing 14. The facing sheets 24 and 26 are so cut, stamped or punched to shape suitable for covering the faces of the web and extending outwardly to at least the outer edge of the web. In a modification, the facing sheets may be of such a size as to so project beyond the edge of the web that, when molded to the web, the facing sheets extend inwardly at their outer ends to partially face the periphery of the web. This protects the edge of the flanges forming the pulley groove from chipping.

In order to provide a free running pulley, a ball bearing 28 may be carried in the bushing 14. The ball bearing may comprise a suitable bearing race 30 of a size suitable for making a tight fit with the bushing 14 and a bearing sleeve 32 disposed centrally of the bearing race. Suitable ball bearings 34 are so carried in the bearing race as to seat on the bearing sleeve 32.

The web 12 of the pulley may be molded from laminated sheets of fibrous material impregnated with a condensation resin or may be molded from macerated or comminuted fibrous material impregnated with the condensation resin product. In a particular embodiment of this invention, a pulley for use in airplanes may be produced by pre-forming a predetermined amount of comminuted impregnated fibrous material under high pressures of from 10 to 25 tons into the desired shape of the web either with or without the pulley groove therein. The pre-formed web may then be disposed in a suitable mold in which the bushing 14 is centrally disposed with a facing sheet of suitable size on each of the side faces of the web. When subjected to suitable heat and pressure, the facing sheets, pre-formed web and bushing are consolidated into an integral unit with the web securely interlocked with the bushing. After being thus consolidated, the bearing comprising the bearing race 30, ball bearings 34 and bearing sleeve 32 may then be pressed into the bushing 14 and where desired the edge of the bushing may be spun over the edge of the bearing race as indicated at 36 in Figure 2, to securely hold the bearing in the bushing 14.

Under test, it has been found that the reenforcing facing sheets applied to the web of fibrous material do not substantially add to the weight of the finished pulley. By reenforcing the flanges as described hereinbefore, the flange strength against shearing has been increased from about 175 pounds for a pulley without reenforcement to about 300 pounds for a pulley constructed in accordance with this invention. The provision of the bearing including the bearing race, ball bearings and bearing sleeve, together with the substantially light weight web containing the pulley groove, reenforced as described, provides a free running pulley.

Although this invention has been described with reference to a specific embodiment thereof, it is, of course, not to be limited thereto except insofar as is necessitated by the prior art and the scope of the appended claims.

I claim as my invention:

1. A composite pulley comprising in combination, a bushing having a knurled surface, a web formed of comminuted fibrous material impregnated with condensation resin extending outwardly from the knurled surface of the bushing, a sheet of fibrous material impregnated with condensation resin disposed on each of the side faces of the web and extending outwardly to at least the outer edge of the web, the web and facing sheets of impregnated fibrous material being consolidated and hardened into an integral mass secured to the knurled surface of the bushing, the outer edge of the mass having a recess extending about its periphery between the facing sheets to provide a groove in the portion formed from the comminuted material having reenforced side walls.

2. A composite pulley comprising in combination, a bushing having a knurled surface, a web formed of comminuted fibrous material impregnated with condensation resin extending outwardly from the knurled surface of the bushing, a sheet of fibrous material impregnated with condensation resin disposed on each of the side faces of the web and extending outwardly to at least the outer edge of the web, the web and facing sheets of impregnated fibrous material being consolidated and hardened into an integral mass secured to the knurled surface of the bushing, the outer edge of the mass having a recess extending about its periphery between the facing sheets to provide a groove in the portion formed from the comminuted material having reenforced side walls, and a bearing including a bearing race, ball bearings and a bearing sleeve disposed in the bushing to provide a free running pulley.

3. A composite pulley comprising in combination, a bushing having a knurled surface, a web formed of comminuted fibrous material impregnated with condensation resin extending outwardly from the knurled surface of the bushing, a sheet of fibrous material impregnated with condensation resin disposed on each of the side faces of the web and extending outwardly to at least the outer edge of the web, the web and facing sheets of impregnated fibrous material being consolidated and hardened into an integral mass secured to the knurled surface of the bushing, the facing sheets of the integral mass extending inwardly at their ends to partially face the periphery of the web, the outer edge of the mass having a recess extending about its periphery between the facing sheets to provide a groove in the portion formed from the comminuted material having reenforced side walls, and a bearing disposed in the bushing to provide a free running pulley, the bushing being spun over the edge of the bearing to retain it in position in the bushing.

4. In a pulley, the combination with a bearing sleeve of, a web formed of comminuted fibrous material impregnated with condensation resin, a sheet of fibrous material impregnated with condensation resin disposed on each side of the side faces of the web and extending outwardly to at least the outer edge of the web, the web and facing sheets of impregnated fibrous material being consolidated and hardened into an integral mass, the outer edge of the mass having a recess extending about its periphery between the facing sheets to provide a groove having reinforced side walls in the portion formed from the comminuted material, and means for securing the web to the bearing sleeve.

HOWARD R. MOYER.